United States Patent
Faccin et al.

(10) Patent No.: US 7,484,240 B2
(45) Date of Patent: Jan. 27, 2009

(54) MECHANISM TO ALLOW AUTHENTICATION OF TERMINATED SIP CALLS

(75) Inventors: Stefano Faccin, Dallas, TX (US); Franck Le, Irving, TX (US)

(73) Assignee: Nokia Corporation, Espoo (FI)

( * ) Notice: Subject to any disclaimer, the term of this patent is extended or adjusted under 35 U.S.C. 154(b) by 774 days.

(21) Appl. No.: 09/905,463

(22) Filed: Jul. 13, 2001

(65) Prior Publication Data

US 2003/0014668 A1 Jan. 16, 2003

(51) Int. Cl.
H04L 29/00 (2006.01)

(52) U.S. Cl. .................. 726/4; 713/151; 713/160; 713/161; 713/168; 713/170; 380/247; 380/248; 380/249; 709/227; 709/228; 709/229

(58) Field of Classification Search ............... 713/201, 713/151, 160, 161, 168, 170; 379/93.32; 455/445, 432, 436, 435, 512; 726/4; 380/247, 380/248, 249; 709/227, 228, 229
See application file for complete search history.

(56) References Cited

U.S. PATENT DOCUMENTS

| | | | | |
|---|---|---|---|---|
| 5,343,529 | A * | 8/1994 | Goldfine et al. ............... 705/75 |
| 6,425,004 | B1 * | 7/2002 | Hardjono .................... 709/223 |
| 6,434,143 | B1 * | 8/2002 | Donovan .................... 370/356 |
| 6,446,127 | B1 * | 9/2002 | Schuster et al. ............. 709/227 |
| 6,477,150 | B1 * | 11/2002 | Maggenti et al. ............ 370/312 |
| 6,662,223 | B1 * | 12/2003 | Zhang et al. ................ 709/224 |
| 6,865,681 | B2 * | 3/2005 | Nuutinen .................... 713/201 |
| 7,024,688 | B1 * | 4/2006 | Faccin et al. .................... 726/4 |
| 7,120,934 | B2 * | 10/2006 | Ishikawa ..................... 726/23 |
| 7,136,387 | B2 * | 11/2006 | Gallant et al. .......... 370/395.52 |
| 7,139,370 | B1 * | 11/2006 | Tse ......................... 379/88.17 |
| 2002/0003789 | A1 * | 1/2002 | Kim et al. .................... 370/338 |
| 2002/0013900 | A1 * | 1/2002 | Ibuki ......................... 713/168 |
| 2003/0133454 | A1 * | 7/2003 | Gallant et al. ............ 370/395.1 |

FOREIGN PATENT DOCUMENTS

| | | |
|---|---|---|
| EP | 0 998 095 | 5/2000 |
| WO | WO 00/69140 | 11/2000 |

OTHER PUBLICATIONS

Handley, "SIP: Session INitiation Protocol", Network Working Group, Mar. 1999.*
Handley M. et al. "Very Large Conferences on the Internet: the Internet Multimedia Conferencing Architecture", Computer Networks, Elsevier Science Publishers B.V., Amsterdam, NL, vol. 31, NR. 3, pp. 191-204 XP004304598 ISSN: 1389-1286 section 8.1 section 8.3.

* cited by examiner

*Primary Examiner*—Kambiz Zand
*Assistant Examiner*—Tongoc Tran
(74) *Attorney, Agent, or Firm*—Squire, Sanders & Dempsey, LLP

(57) ABSTRACT

The invention proposes a method of performing authentication of a subscriber during a subscriber equipment terminated call, comprising the steps of sending a session invitation message (S4, S5) to the subscriber equipment, the session invitation message including authentication information (AuthData1), and performing an authentication procedure in the subscriber equipment by using the authentication information. The invention also proposes a corresponding network system, network control element and subscriber entity.

19 Claims, 5 Drawing Sheets

MECHANISM TO ALLOW AUTHENTICATION OF TERMINATED SIP CALLS

FIELD OF THE INVENTION

The present invention relates to a method and a network system for performing authentication of terminated calls, in particular of terminated SIP (Session Initiation Protocol) calls.

BACKGROUND OF THE INVENTION

In general, subscriber to corresponding services are authenticated.

There are many different authentication methods. In the following, a Challenge Response based authentication method is described in short as an example.

The network node which actually performs the authentication requests a parameter set consisting of a random number RAND (usually, 128 bit) and a scheduled result (RESP) from an Authentication Center (AuC) and sends the RAND to the mobile node. In turn, the mobile node (MS, mobile station) has to calculate a result RESP_CALC from the number RAND. The calculation is performed in the mobile node by using a secret algorithm. The user identity, the challenge and a key shared between the user and the authenticator are taken as inputs to an authentication algorithm, thus resulting in the expected output. The shared key must be kept private and only the user and the authenticator should know it; but the authentication algorithm can be publicly known.

The result RESP_CALC is transmitted to the network node performing a verification of the authentication. It checks whether the scheduled result RESP is equal to the calculated result RESP_CALC. If both results are equal, the authentication is successful, otherwise it fails.

In mobile applications, and in particular in cellular networks, the serving network (i.e. the network providing services to the mobile nodes) can typically authenticate the mobile node in three situations: when the mobile node registers with the network, when the mobile node establishes communications, and when incoming communications are terminated to the mobile node.

The invention applies to networks, such as, e.g., Voice over IP (VoIP) networks, where the SIP protocol is adopted as control protocol to setup multimedia communications, for example. In particular, the invention applies to the case of mobile VoIP networks where calls need to be delivered to mobile nodes.

The SIP protocol provides a mechanism to allow authentication of a SIP terminal when the terminal registers to a SIP server and when the terminal establishes a SIP call. Currently, SIP does not foresee any mechanism to support authentication of SIP calls delivered to the mobile node. That is, SIP, as currently defined, does not allow authentication of terminated calls.

Thus, in order to apply SIP to VoIP mobile network, authentication of mobile terminated calls need to be supported.

SUMMARY OF THE INVENTION

Therefore, the object underlying the invention resides in providing a mechanism which allows an authentication of a subscriber in a mobile terminated call.

This object is solved by a method of performing authentication of a subscriber during a subscriber equipment terminated call, comprising the steps of
sending a session invitation message to the subscriber equipment, the session invitation message including authentication information, and
performing an authentication procedure in the subscriber equipment by using the authentication information.

Alternatively, the above object is solved by a network control element, wherein, during a subscriber equipment terminated call, the network control element is adapted
to send a session invitation message to the subscriber equipment, the session invitation message including authentication information.

Furthermore, the above object is solved by a subscriber equipment which is adapted to be connected to a network, and, during a subscriber equipment terminated call,
to receive a session invitation message from the network, the session invitation message including authentication information, and
to perform an authentication procedure by using the authentication information.

Thus, according to the invention, information necessary for performing an authentication procedure is included in a session invitation message which is sent during a subscriber equipment terminated call to the subscriber equipment.

Therefore, no additional messages have to be created or transmitted, thus reducing the signaling load on the network.

Moreover, the above mechanism can easily be implemented, since only new parameters have to be included in fields of existing control protocol messages. That is, the invention provides a simple mechanism and can easily be implemented.

A response message as a response to the session invitation message may be sent from the subscriber equipment to the network, the response message including a result of the authentication procedure.

Thus, the calculated result of the authentication procedure is included in a response message to the session invitation. That is, also for transmitting the result of the authentication, no additional message is required, which also reduces the signaling load on the network.

The authentication procedure result may be verified in a network control element. In case of a positive authentication result, the response message of the subscriber equipment may be forwarded to the originating entity without the result of the authentication procedure.

Thus, the establishment of the call between the originating entity (i.e., caller) and the subscriber entity (i.e., callee) can easily be completed by forwarding the response message without the parameter indicating the authentication procedure result calculated by the subscriber equipment.

In case of a negative verification, a failure message may be forwarded to the originating entity. Hence, in case the subscriber equipment is not authenticated, the originating entity (i.e., the caller) is notified about this.

In the network, the SIP (Session Initiation Protocol) protocol may be adopted as a control protocol. For example, the session invitation message may be a SIP INVITE request including an authentication header field. The response message may be a SIP response message including an authorization header field.

The verification may be performed in a network control element serving the originating entity.

Alternatively, the verification may be performed in another network control element than that network control element serving the originating entity. In this case, a scheduled result for the authentication may be forwarded to the other network control element by including the scheduled result into the session invitation message. Moreover, the other network control element may extract the scheduled result from the session invitation message in the other network control element and forward the session invitation message without the scheduled result to the subscriber equipment.

In this way, also the part authentication information which is necessary to verify the authentication can be conveyed in the session invitation message (e.g., SIP INVITE request). That is, the signaling load on the network is further reduced.

The network control element may be adapted to determine whether it has to perform the verification of the authentication or not. Thus, in response to this determination, the network control element may perform the above steps or not.

Optionally, a response message may be sent as a response to the session invitation message from the subscriber equipment to the network, the response message including a result of the authentication procedure and network authentication information which is used by the subscriber equipment to perform an authentication of the network. That is, the user, i.e., the callee has the possibility to perform an authentication of the network. During such a network authentication, the network may determine a network authentication result in response to the network authentication information by the network, and send the network authentication result to the subscriber equipment, such that the subscriber equipment may verify the network authentication result.

Furthermore, the authentication procedure performing step and the verification step may be repeated a predetermined number of times, wherein different authentication information may be used. That is, a mutiple round trips authentication scheme may be used.

The authentication data to be sent to the subscriber equipment may comprise a invitation to the user to type a password. Hence, the authentication result may comprise the typed password. Hence, also an authentication scheme may be applied in which not only the authentication of a SIM card or the like is checked, but also of the user itself, since the user itself has to type the password.

BRIEF DESCRIPTION OF THE DRAWINGS

The present invention will be more readily understood with reference to the accompanying drawings in which.

DETAILED DESCRIPTION OF THE PREFERRED EMBODIMENT

Figure 1:
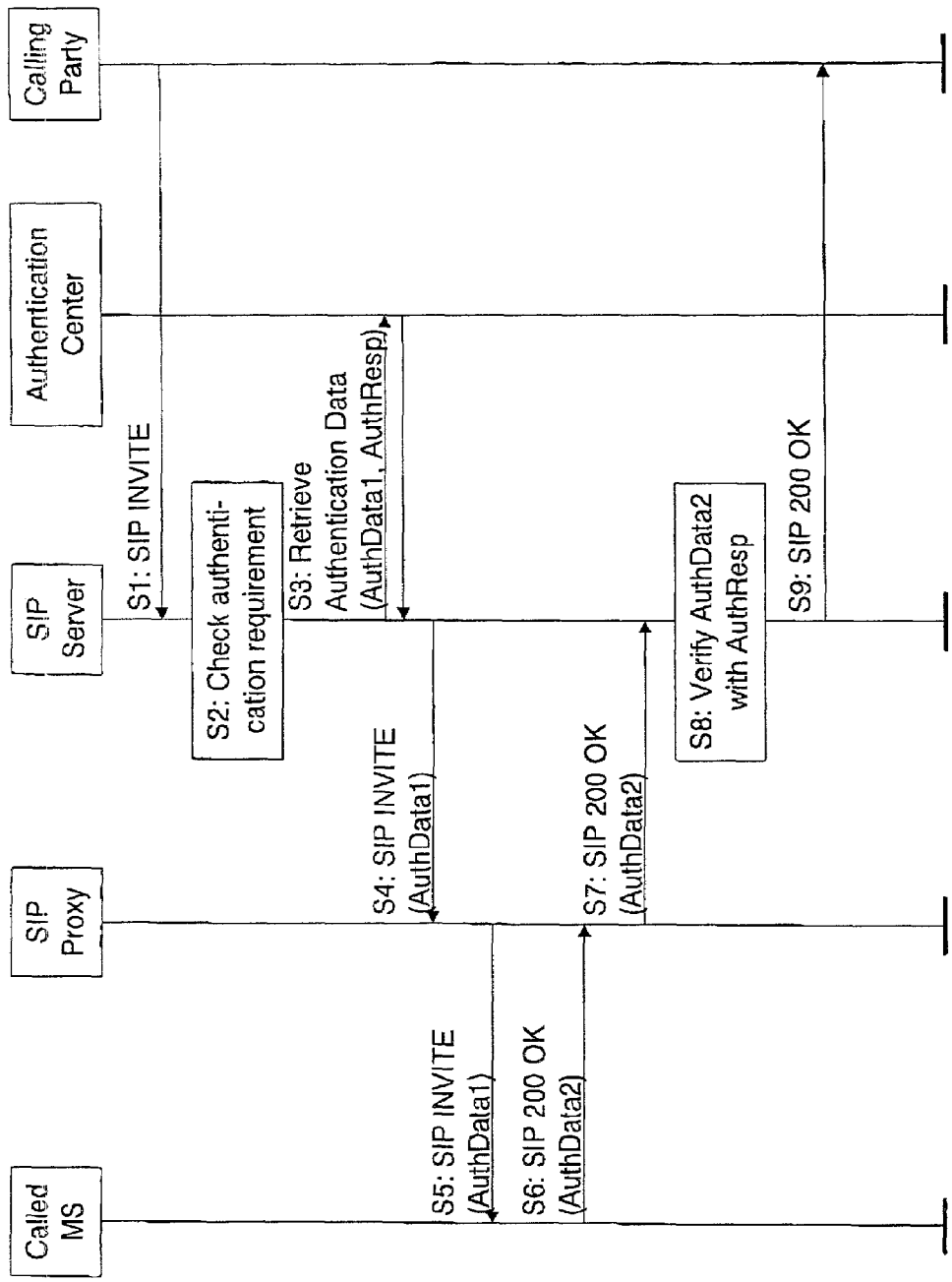
FIG. 1 shows a diagram illustrating a signaling flow between a SIP server, a SIP proxy and mobile node MS according to a preferred embodiment of the invention, wherein the authentication is verified in the SIP server.

In the following, a preferred embodiment of the invention is described in more detail with reference to the accompanying drawings.

According to the present embodiment, a mechanism is introduced which allows an authentication of terminated SIP calls by requesting the terminated node to authenticate itself as a part of the call termination procedure.

That is, during the call termination procedure, i.e., receiving a call invitation from another party and responding to this invitation, also an authentication is performed.

Such an invitation and responding may be advantageously performed by using the SIP (Session Initiation Protocol), however, it is noted that the present invention is not limited thereon.

In particular, the invitation according to SIP is performed by sending two requests: A SIP INVITE request, by which the caller invites the callee to participate in a particular call or multimedia session or the like. The callee answers with a SIP response. In case he agrees to participate in the call, the callee sends a 200 OK response to the caller. The caller then sends a second SIP request, i.e., ACK request, in order to acknowledge the response of the callee. Otherwise, in case the caller is no longer interested in the call or session, he may send a BYE request to the callee in order to terminate he session.

The requests, in particular the INVITE request, contain several information within fields. For example, a description of the session to which the callee is invited is included in the fields.

According to the present embodiment, an additional field, i.e., an additional parameter has to be included into the SIP INVITE request. Namely, the information needed for performing the authentication is included in the SIP INVITE request. In particular, the RAND number which is provided by an authentication entity (e.g., AuC or a SIP server which actually performs the authentication) has to be included in the SIP INVITE request. These additional authentication is referred to as authentication extension in the following.

According to the present embodiment, the WWW-Authenticate Response-Header field which is already defined in SIP is used for such a field.

In SIP as currently defined, the WWW-Authenticate response-header field has to be included in 401 (Unauthorized) response messages. The field value consists of at least one challenge that indicates the authentication scheme(s) and parameters applicable to the Request-UPI.

Thus, no new field has to be defined, but an already defined field (which, however, was used for another kind of request) may include the necessary information, namely the RAND, i.e., challenge, and information regarding the authentication scheme.

After receiving such a SIP INVITE request, the mobile node responses with a SIP response like, e.g., 200 OK or the like. Furthermore, the mobile node calculates the RESP_CALC value and includes this value into the SIP response.

Hence, also a new field has to be included into the SIP responses. Preferably, also here an already defined field may be adopted for such a field. According to the present embodiment, the Authorization Request Header field may be included into the SIP response.

According to SIP as currently defined, the Authorization Request header field is included in case a user agent wishes to authenticate itself with a server, usually (but not necessarily) after receiving a 401 (Unauthorized) response. The Authorization field value consists of credentials containing the authentication information of the user agent for the realm of the resource being requested.

In the following, some of the possible SIP messages into which the Authorization Request Header field has to be added according to the present embodiment are described in short:

1) SIP INVITE: as mentioned above, the WWW-Authenticate Response-Header field (already defined in SIP) needs to be added.
2) SIP 200 OK: the Authorization Request Header field (already defined in SIP) needs to be added. The 200 OK response is sent in case the SIP INVITE request has succeeded. The information returned with the response depends on the method used in the request, for example INVITE: The callee has agreed to participate; the message body indicates the callee's capabilities.
3) 403 Forbidden: the Authorization Request Header field (already defined in SIP) needs to be added. This response is sent in case the server understood the request, but is refusing to fulfill it. Authorization will not help, and the request should not be repeated.
4) 405 Not allowed: the Authorization Request Header field (already defined in SIP) needs to be added. This response is sent in case the method specified in the request-Line is not allowed for the address identified by the Request-URI. The response must include an Allow header field containing a list of valid methods for the indicated address.
5) 408 Request Timeout: the Authorization Request Header field (already defined in SIP) needs to be added. This response is sent in case the called entity could not produce a response, e.g., a user location, within the time indicated in an Expires request-header field.
6) 409 Conflict: the Authorization Request Header field (already defined in SIP) needs to be added. This response is sent in case the request could not be completed due to a conflict with the current state of the resource. This response is returned if the action parameter in a REGISTER request conflicts with existing registrations.
7) 410 Gone: the Authorization Request Header field (already defined in SIP) needs to be added. This response is sent in case the requested resource is no longer available at the called entity (i.e., in the present embodiment, the mobile node MS) and no forwarding address is known.
8) 415 Unsupported Media Type: the Authorization Request Header field (already defined in SIP) needs to be added. This response is sent in case the called entity is refusing to service the request because the message body of the request is in a format not supported by the requested resource for the requested method.
9) 420 Bad Extension; the Authorization Request Header field (already defined in SIP) needs to be added. This response is sent in case the server did not understand the protocol extension specified in a Require header field.
10) 480 Temporarily Unavailable: the Authorization Request Header field (already defined in SIP) needs to be added. This response is sent in case the callee's end system (i.e., the mobile node) was contacted successfully but the callee is currently unavailable (e.g., not logged in or logged in in such a manner as to preclude communication with the callee).
11) 482 Loop Detected: the Authorization Request Header field (already defined in SIP) needs to be added. This response is sent in case the server received a request with a via path containing itself.
12) 484 Address Incomplete: the Authorization Request Header field (already defined in SIP) needs to be added. This response is sent in case the called entity received a request with a To address or Request-URI that was incomplete.
13) 485 Ambiguous: the Authorization Request Header field (already defined in SIP) needs to be added. This response is sent in case the callee address provided in the request was ambiguous.
14) 486 Busy Here: the Authorization Request Header field (already defined in SIP) needs to be added. This response is sent in case the called entity (i.e., the callee's end system) was contacted successfully but the callee is currently not willing or able to take additional calls.
15) 603 Decline: the Authorization Request Header field (already defined in SIP) needs to be added This response is sent in case the called entity was successfully contacted but the user explicitly does not wish to or cannot participate,
16) 606 Not Acceptable: the Authorization Request Header field (already defined in SIP) needs to be added. This response is sent in case the called entity was contacted successfully but some aspects of the session description such as the requested media, bandwidth, or addressing style were not acceptable. A 606 (Not Acceptable) response means that the user wishes to communicate, but cannot adequately support the session described.

In the following an example is given as to how a challenge response authentication procedure is adopted to authenticate the mobile node:

The above-described WWW-authenticate Response Header field contains:
i. indication of challenge response algorithm
ii. a RAND parameter
iii. a RESP parameter where RAND is a random parameter generated by an entity, here named AuC (Authentication Center), that is outside the scope of this invention. AuC also generates the RESP parameter, i.e., the scheduled result.

When the mobile node (i.e., called entity) sends any of the responses 2-16 identified above, the above described Authorization Request Reader field will contain the parameter CALC_RESP (of the same length of RESP).

In the following, the authentication procedure according to the present embodiment is described by referring to FIG. 1.

In this example, a call is to be initiated between a caller (calling mobile node MS, as an example for an originating entity) and a callee (called MS, as an example for a subscriber entity) via a SIP server and a SIP proxy (as examples for a network control element). It is noted that both SIP server and SIP proxy may be technically structured in the same way, however, their functions are different. The server serves the caller, while the proxy forwards signaling.

1) The SIP server, receiving an incoming mobile terminated call for a mobile node from a calling party (step S1) determines that the call needs to be authenticated (e.g. based on profiles or policies) (step S2) and retrieves (according to a mechanism outside the scope of the invention) necessary data for the authentication from an authentication center (step S3). These authentication data include first data Auth-Data1 which is to be forwarded to the called mobile node and second data AuthResp which is to be used by the SIP server.

2) The SIP server forwards the SIP INVITE request (containing the authentication extensions with the authentication parameters) towards the mobile node (steps S4 and S5). According to the present embodiment, the SIP server determines according to network policies that it is the authentication verification point. Hence, it forwards the SIP INVITE request with the authentication extensions containing only AuthData1 and puts its URL in the VIA field.

Any SIP server or proxy receiving an authentication extension with only AuthData1 will simply forward the message. In the signaling diagram according to FIG. 1, this is the case for the SIP proxy receiving the SIP INVITE request from the SIP server. That is, the SIP proxy forwards the SIP INVITE request to the mobile node unchanged.

3) The mobile node (MS), receiving the SIP INVITE request containing the RAND parameter, executes the authentication algorithm taking AuthData1 as input and producing an output value AuthData2.

4) When the mobile node answers to the SIP INVITE request with any of the messages identified in the above points 2-16, it returns the AuthData2 parameter. In the signaling diagram shown in FIG. 1, it is assumed that the user accepts the SIP INVITE request and that there are no further problems (due to which one of the above responses 3 to 16 would be sent). Thus, a 200 OK response is sent in step S6.

5) The response is forwarded transparently by the SIP proxies until it reaches the SIP server designated for the verification for the authentication. In the example of FIG. 1, only one SIP proxy is concerned, and this SIP proxy forwards the 200 OK response including the parameter AuthData2 of the mobile node to the SIP server in step S7.

6) The SIP server verifies the parameter AuthData2 with the parameter AuthResp which was retrieved from the authentication center in step S3.

After a successful verification of the authentication, the SIP server forwards the 200 OK response of the mobile node to the caller in step S9. In case of an unsuccessful authentication, the SIP server may send a corresponding failure message to the caller. Such a message may be a 405 Not Allowed message including a parameter indicating to the caller that the authentication of the callee was unsuccessful.

In case of a successful authentication, the caller may send an SIP ACK request after receiving the 200 OK response. That is, the session is established according to normal SIP.

The above steps were described with respect to general authentication. In the following, the steps are shortly described in case a challenge response is employed.

In this case, the parameter AuthData1 sent to the called mobile node in steps S4 and S5 is the parameter RAND. The mobile node calculates the parameter CALC_RESP, which is the parameter AuthData2 sent to the SIP server in steps S6 and S7. The parameter AuthResp retrieved from the authentication center in step S3 is the parameter RESP. Thus, in step S8 the verification is performed by comparing the value of RESP with the value of CALC_RESP. If both values are equal, the authentication is successful, otherwise it fails.

Figure 2:
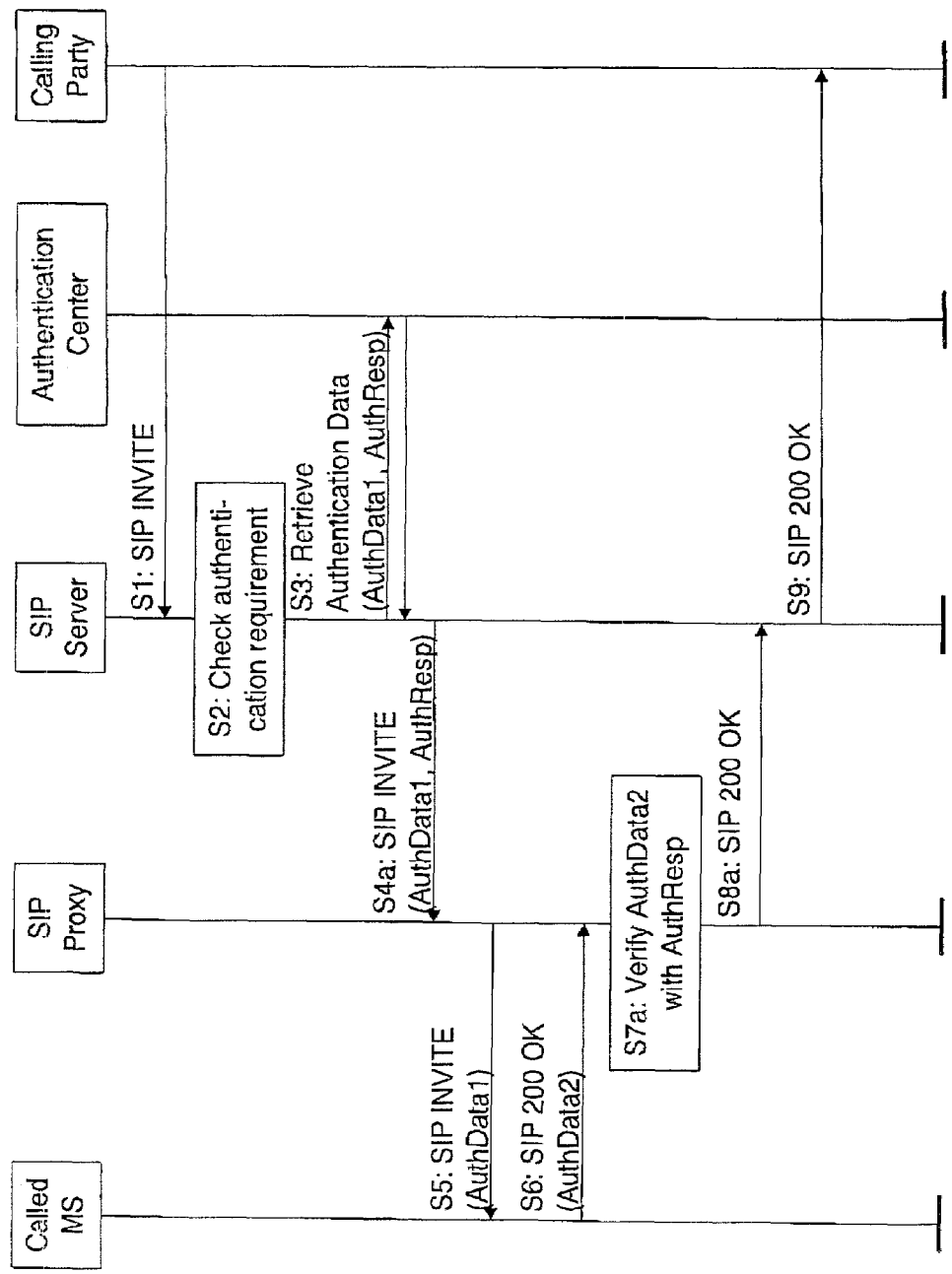
FIG. 2 shows a diagram illustrating a signaling flow between a SIP server, a SIP proxy and mobile node MS according to the preferred embodiment of the invention, wherein the authentication is verified in the SIP proxy.

As already mentioned above, the functions of the SIP proxies/servers included in the path between the caller and callee may be different. This is illustrated in the example of FIG. 2 showing a signaling flow between a caller and a callee via a SIP server and a SIP proxy, wherein in this example it is assumed that the SIP server is not the authentication verification point, but the SIP proxy. The SIP server may determine according to network policies that it is not the authentication verification point. In this case, it forwards the SIP INVITE request with the authentication extensions containing AuthData1 and AuthResp.

Any SIP server or proxy receiving authentication extension with both RAND and RESP decides whether to forward the INVITE message with only RAND or whether to forward the INVITE message with both RAND and RESP.

The first alternative (forwarding the INVITE message with only RAND) happens if the mobile node is directly reachable by the SIP server or proxy without passing through any other SIP server or proxy (this can be determined by screening the list of users who have registered to this SIP server/proxy). Otherwise, the first alternative may happen based on network policies.

The second alternative (forwarding the INVITE message with both RAND and RESP) happens based on network policies.

In the signaling flow of FIG. 2, same or similar steps as in FIG. 1 are denoted by same reference signs, such that a repeated description thereof is omitted.

As mentioned above, in this example the SIP server determines based on the network policies that it is not the authentication verification point, but the SIP proxy. Hence, it forwards the INVITE request including AuthData1 and AuthResp to the SIP proxy 1 in step S4a.

Based on the network policies and on receiving the INVITE request including AuthData1 and AuthResp, the SIP proxy determines that it is the authentication verification point. Hence, it extracts the AuthResp from the INVITE message and stores it. Thereafter, it forwards the INVITE request including only AuthData1 in step S5. In addition, the SIP proxy includes its address in the VIA field in order to indicate that it is the authentication verification point.

In step S7a, the SIP proxy verifies AuthData2 with AuthResp, in the same way as it is performed by the SIP server in step S8 of FIG. 1.

In case of a positive result, the SIP 200 OK response is forwarded to the caller in steps SS8a and S9 via the SIP server.

Figure 3:
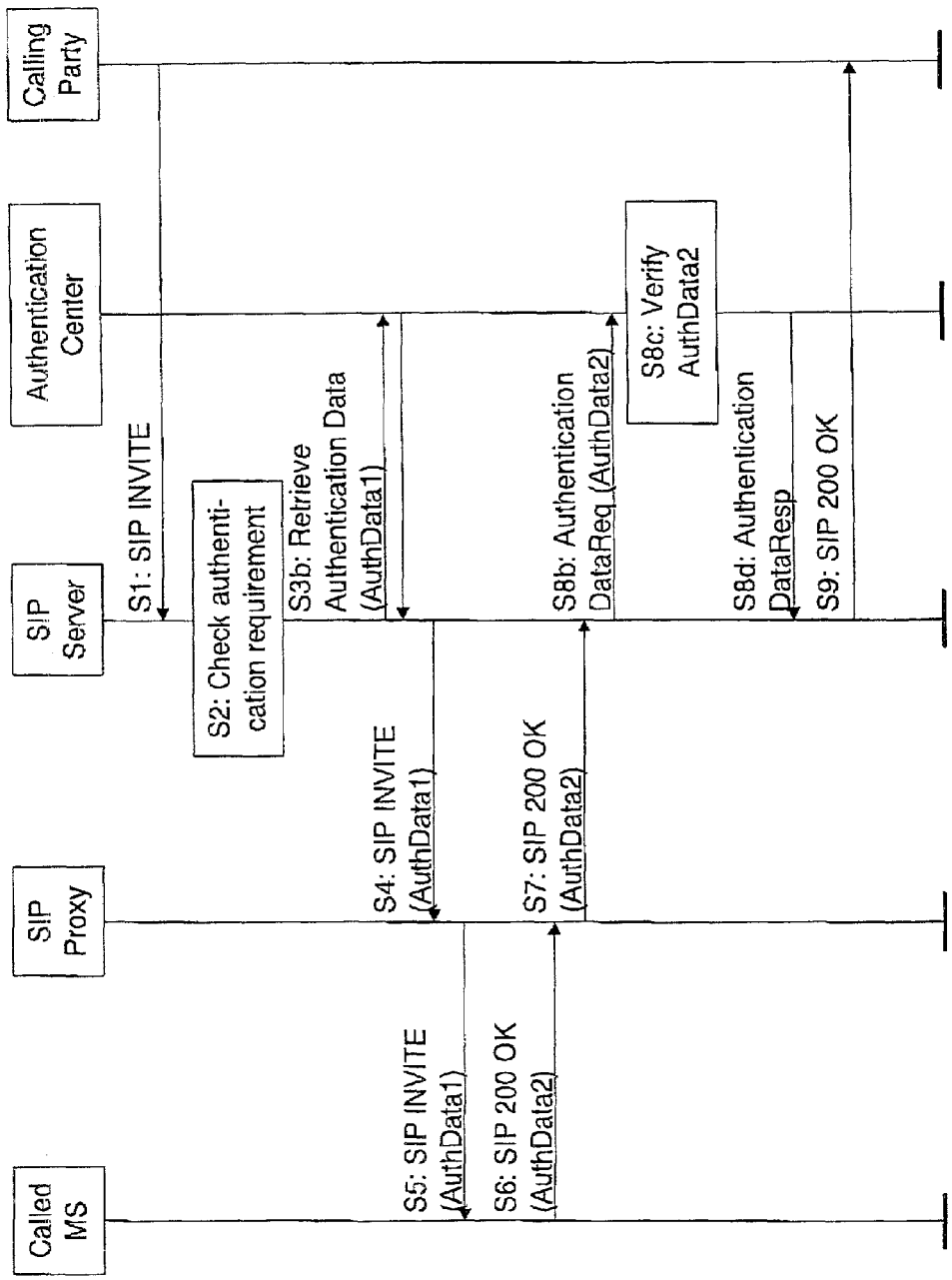
FIG. 3 shows a diagram illustrating a signaling flow between a SIP server, a SIP proxy and mobile node MS according to the preferred embodiment of the invention, wherein authentication is verified in an authentication center.

FIG. 3 shows a signaling flow for a case in which neither a SIP proxy nor a SIP server performs the authentication, but wherein the authentication is performed by an authentication center.

In the signaling flow of FIG. 3, same or similar steps as in FIG. 1 are denoted by same reference signs, such that a repeated description thereof is omitted.

As mentioned above, in this example both the SIP server and the SIP proxy determine based on the network policies that they are not the authentication verification point, but the authentication center. Hence, in step S3b only the AuthData1 to be sent to the called mobile node is retrieved.

In step S8b, the SIP server performs an Authentication Data Request including AuthData2 from the called mobile note to the authentication center, which in turn verifies AuthData in step S8c. In step S8d, the authentication center sends an Authentication Data Response to the SIP server. In case of positive authentication, the SIP server forwards the SIP 200 OK response in step S9 to the calling party. Otherwise, the SIP server may send a failure message to the calling party, as described above.

Figure 4:
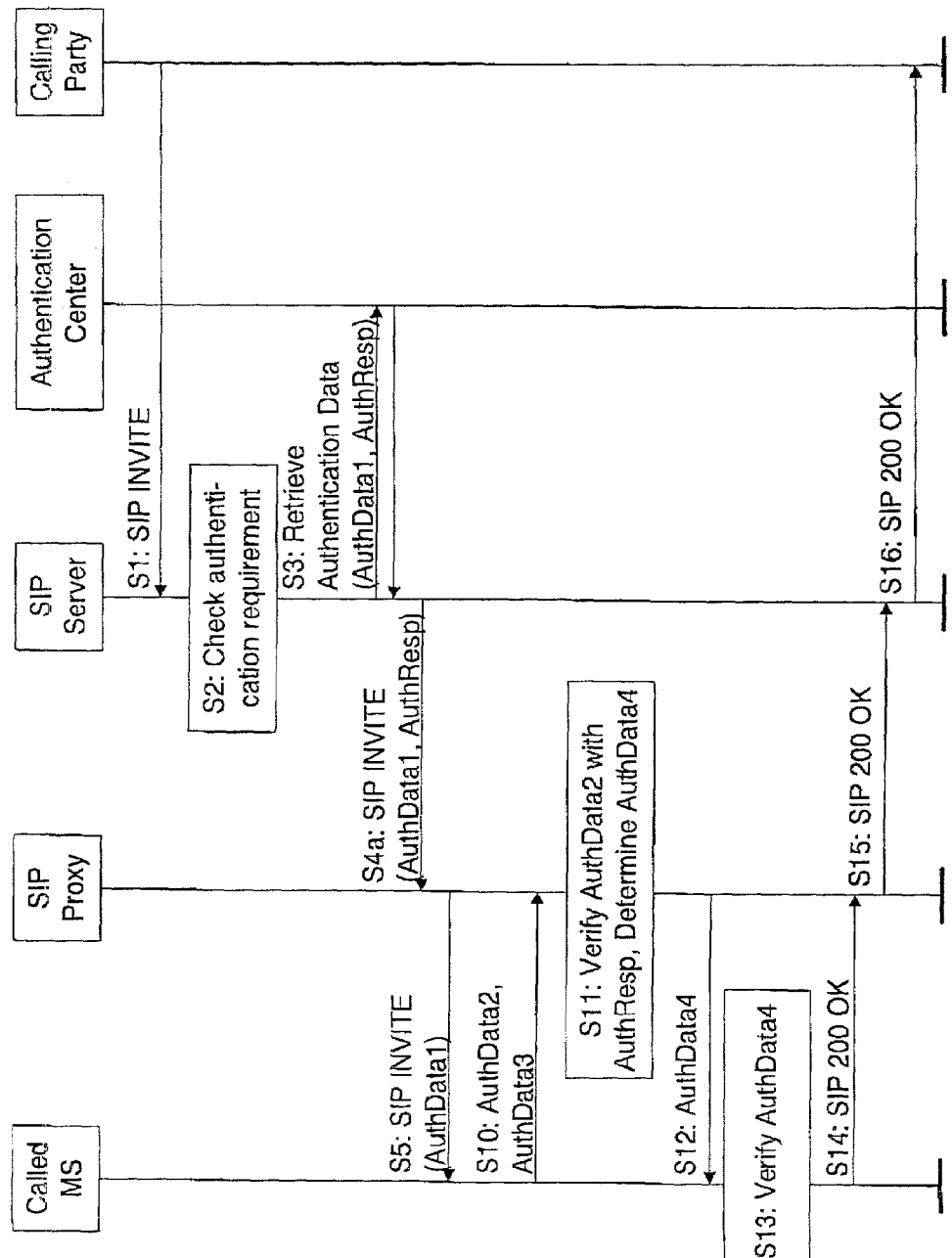
FIG. 4 shows a diagram illustrating a signaling flow according to a modification of the preferred embodiment of the invention.

FIG. 4 shows a modification of the preferred embodiment, according to which the callee may also perform a network authentication.

When performing user authentication, the user may also want to authenticate the network to prevent network impersonation. A man in the middle may otherwise try to send requests to the valid user and re-use the authentication result to perform undesirable operations.

In FIG. 4, basically the same situation as shown in FIG. 2 is considered. That is, it is assumed that the SIP proxy performs the verification. However, also the other situations as described above with connection to FIGS. 1 and 3 are possible. Same reference signs in FIG. 4 and FIG. 2 indicate same or basically same steps, and only those steps different from those of FIG. 2 are described in the following.

Thus, after the SIP INVITE request including AuthData1, the callee produces AuthData2 in response to the AuthData1. In addition, the callee (i.e., the subscriber equipment) creates additional authentication data AuthData3. These authentication data are used for the network authentication.

In step S10, the authentication result, AuthData2, and the additional authentication data AuthData3 are sent to the SIP proxy. Here, a suitable SIP message may be used, for example a 401 Unauthorized message. That is, a 200 OK message (as in case of FIGS. 1 to 3) is not sent yet since the callee wants to perform a network authentication first.

In step S11 the SIP proxy verifies AuthData2, and after a positive verification, the SIP proxy produces authentication data AuthData4 in response to the AuthData3, which are sent to the callee in step S12. The authentication data AuthData4 may be included in a suitable SIP message. In step S13 the callee verifies AutData4, and only in case the verification is successful, the callee sends the SIP 200 OK response in step 514. This SIP 200 OK response forwarded to the caller in steps S15 and S16.

As an example, when receiving the RAND (as described above as an example for AuthData1), the callee computes the RES (as described above as an example for AuthData2) to get authenticated by the network. But in the same time, he may also generate a RANDU (as an example for AuthData3) to authenticate the network. The callee will therefore send both the RES and the RANDU to the network.

The network will authenticate the user based on the RAND and RES as described above in the description of the first embodiment.

In addition, if user authentication is successful, the network computes network authentication data (as an example for AuthData4) based on RANDU and sends it back to the caller.

This is an example of possible network authentication required by the user when the network wants to authenticate him.

It is noted that in the above-described example of FIG. 4 it is assumed that the SIP proxy has the necessary information for determining the network authentication data AuthData4 However, in some cases the SIP proxy may not have this information and/or capabilities. In this cases, the SIP proxy may need to contact the SIP server or Authentication Center (AuC) to compute the network authentication data. That is, in FIG. 4, the SIP server may access, during step 511, the SIP server and/or the authentication center.

Figure 5:
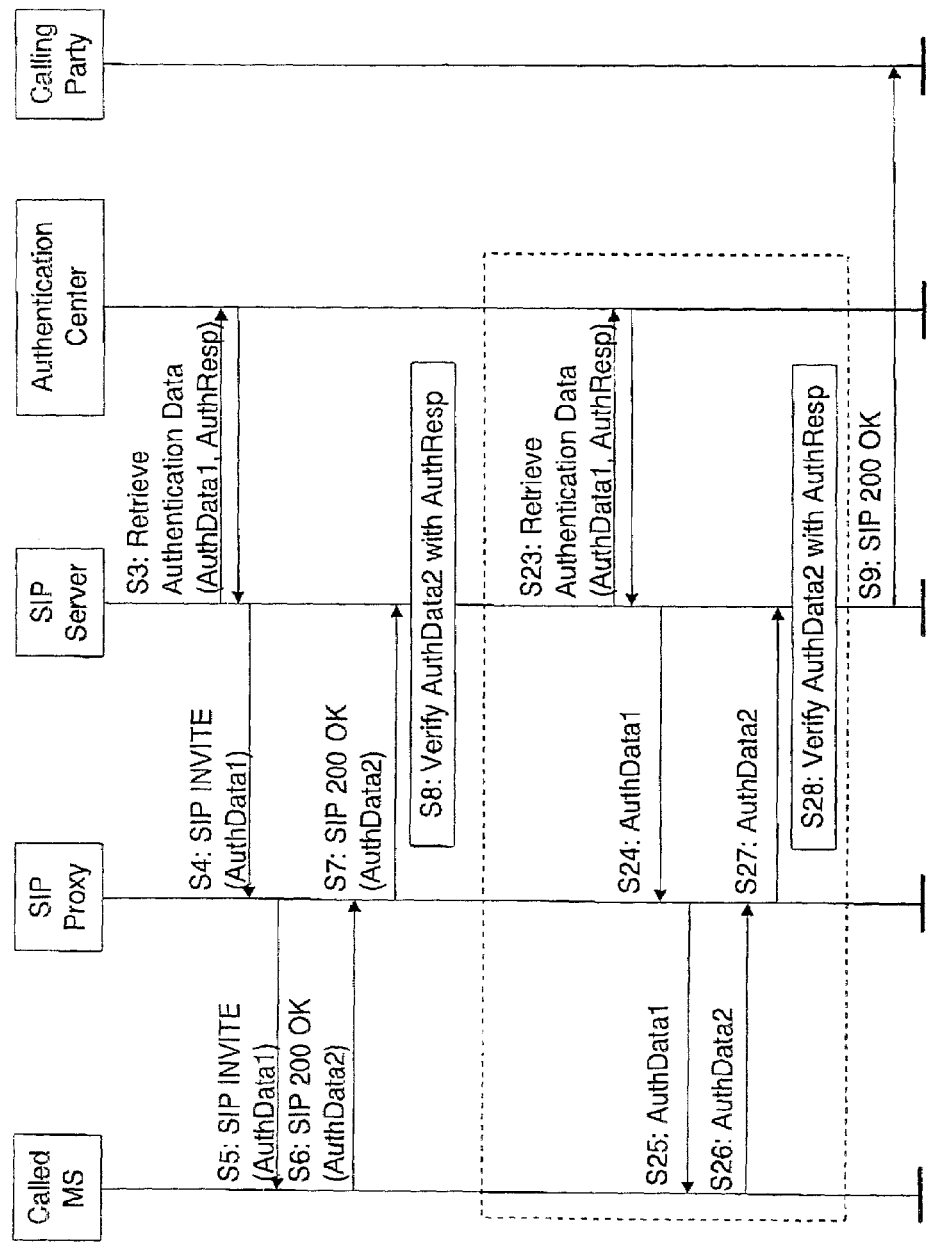
FIG. 5 shows a diagram illustrating a signaling flow according to a further modification of the preferred embodiment of the invention.

FIG. 5 illustrates a further modification of the preferred embodiment according to which a multiple round trips authentication scheme is applied In FIG. 5, same reference signs as in FIG. 1 denote the same steps, so that only different parts are described in the following.

According to this modification authentication scheme is used which requires many round trips between the user and the network. Basically, steps S3 to SS of FIG. 1 may be repeated for a predetermined number of times, wherein always different AuthData1 may be supplied to the callee.

This is shown in FIG. 5 by the steps 323 to S38 which are enclosed in a dotted box. It is noted that in steps S24 to S27 SIP INVITE and SIP 200 OK messages may be used as in steps S4 to S7 for conveying the corresponding authentication data, however, also other suitable SIP messages or other kind of messages may be used.

In every repetition of the loop consisting of the steps S23 to S28, a new set of authentication data AuthData1 and AuthResp is retrieved from the Authentication Center in step S23. That is, in each loop, a values for AuthData1 and AuthResp are set.

After finally the authentication of the subscriber has been confirmed, the SIP 200 OK response is forwarded to the caller in step S9.

According to the above example, also the Authentication Center is involved to process the authentication data (i.e., after a successful result of each part-authentication, a new authentication data set is supplied). However, alternatively also the SIP server may be supplied already in step S3 with all necessary information (i.e., all different values for AuthData1 and AuthResp in each loop).

As a further alternative, the process according to FIG. 5 may also be applied to that of FIGS. 1 and 3. Moreover, it may also be combined with that of FIG. 4. That is, after the final confirmation of the authentication, also a network authentication may be performed.

The above description and accompanying drawings only illustrate the present invention by way of example. Thus, the embodiment may vary within the scope of the attached claims. For example, the above embodiment and the modifications thereof may be arbitrarily combined.

In particular, the authentication procedure described above is not limited on the challenge-response algorithm, but other different existing authentication schemes can be applied in which authentication data are sent to a called node and authentication response data are produced by the called node. Some of the existing authentication schemes may require many round trips (and not only one as described above), e.g. the user may also generate a challenge and try to authenticate the network in the same time, he provides the user authentication data.

An example for another authentication scheme, UMTS AKA (Authentication and key agreement as defined in 3GPP TS 33.102 can be executed. Here, in addition to the RAND as described above, another parameter AUTN is provided for the user. By this parameter, the user is able to perform an authentication of the network.

Moreover, also a password based authentication scheme could be used. In this case, the SIP INVITE message as described above, some text requesting the user to type his password can be included. That is, the authentication data AuthData1 as shown in the figures comprises this text. After the user has typed his password, this password may be included in the authentication data AuthData2 as described above. The password may not be conveyed as plain text, but may also be ciphered such that no one in between can read the password. Moreover, there are several locations (network entities) where the authentication data can be added/removed to support the authentication. The SIP server, SIP proxy and authentication center described above are only examples.

Furthermore, it is noted that in the embodiment described above the VoIP (Voice over IP, i.e., Internet Protocol) was only mentioned as an example. The invention is by no way limited thereon and can be applied to any kind of network system in which an authentication is performed. For example, the invention can also be applied to GSM and UMTS network systems, For example, it may be applied in IETF (Internet Engineering Task Force) and/or 3GPP (Third Generation Partnership Project).

Moreover, also the SIP protocol is only taken as an example for a control protocol. Any control protocol which issues invitation messages and corresponding responses including fields into which the information necessary for performing an authentication may be included can be used.

Moreover, it is noted that the invention is not limited on mobile nodes as callers and/or callee. Instead, any type of communication device, either fixed or mobile, may be applied.

The invention claimed is:

1. An apparatus, comprising:
a transmitter configured to send, during a subscriber equipment terminated call, a session invitation message to a subscriber equipment, the session invitation message comprising authentication information;
a determiner configured to determine whether a verification of the authentication is required;
a processor configured to,
if the verification is not required,
forward a scheduled result to a network control element by including the scheduled result into the session invitation message, and,
if the network control element has to perform the verification,
receive the scheduled result from another network control element, wherein the scheduled result is included in the session invitation message,
extract the scheduled result from the session invitation message,
forward the session invitation message without the scheduled result to the subscriber equipment,
verify an authentication result with the scheduled result, and
repeat the verification for a predetermined number of times, wherein different authentication information are used.

2. The apparatus according to claim 1, further comprising:
a receiver configured to receive a response message as a response to the session invitation message from the subscriber equipment, the response message including a result of an authentication procedure performed by the subscriber equipment.

3. The apparatus according to claim 2, further comprising: a verifier configured to verify the authentication procedure result.

4. The apparatus according to claim 3, further comprising:
a forwarder configured to forward the response message of the subscriber equipment to an originating entity initiating the session invitation without the result of the authentication procedure in case of a positive verification.

5. The apparatus according to claim 3, further comprising:
a forwarder configured to forward a failure message to an originating entity initiating the session invitation in case of a negative verification.

6. The apparatus according to claim 1, wherein a session initiation protocol (SIP) protocol is adopted as a control protocol.

7. The apparatus according to claim 6, wherein the session invitation message is a SIP INVITE request comprising an authentication header field.

8. The apparatus according to claim 2, wherein the response message is a SIP response message comprising an authorization header field.

9. The apparatus according to claim 3, further comprising:
a server configured to serve an originating entity initiating the session invitation.

10. The apparatus according to claim 3, further comprising:
a server configured to serve the subscriber equipment.

11. The apparatus according to claim 1, further comprising:
a receiver configured to receive a response message from the subscriber equipment, the response message including the authentication result of the authentication procedure and network authentication information which is used by the subscriber equipment to perform an authentication of the network.

12. The apparatus according to claim 11, further comprising:
a determiner configured to determine a network authentication result in response to the network authentication information and to send the network authentication result to the subscriber equipment.

13. A method, comprising:
sending, during a subscriber equipment terminated call, a session invitation message from a network control element to the subscriber equipment, the session invitation message comprising authentication information;
determining, by the network control element, whether the network control element has to perform a verification of the authentication or not; and,
in case the network control element does not have to perform the verification, forwarding a scheduled result to a second network control element by including the scheduled result into the session invitation message,
in case the network control element has to perform the verification,
receiving the scheduled result from another network control element, wherein the scheduled result is included in the session invitation message,
extracting the scheduled result from the session invitation message,
forwarding the session invitation message without the scheduled result to the subscriber equipment, and
verifying an authentication result with a scheduled result; and
repeating the verification for a predetermined number of times, wherein different authentication information are used.

14. The method according to claim 13, further comprising:
receiving a response message in the network control element as a response to the session invitation message from a subscriber equipment, the response message including a result of an authentication procedure performed by the subscriber equipment.

15. The method according to claim 14, further comprising:
verifying, by the network control element, the authentication procedure result.

16. The method according to claim 15, further comprising:
forwarding the response message of the subscriber equipment from the network control element to an originating entity initiating the session invitation without the result of the authentication procedure in case of a positive verification.

17. The method according to claim 15, further comprising:
forwarding a failure message from the network control element to an originating entity initiating the session invitation in case of a negative verification.

18. A computer program embodied on a computer-readable medium, the computer program comprising computer code for causing a processor to perform operations comprising:
sending a session invitation message from a network control element to the subscriber equipment, the session invitation message including authentication information;

determining, by the network control element, whether the network control element has to perform a verification of the authentication or not; and, in case the network control element does not have to perform the verification, forwarding a scheduled result to a second network control element by including the scheduled result into the session invitation message, in case the network control element has to perform the verification, receiving the scheduled result from another network control element, wherein the scheduled result is included in the session invitation message, extracting the scheduled result from the session invitation message and forwarding the session invitation message without the scheduled result to the subscriber equipment, verifying an authentication result with a scheduled result; and repeating the verification for a predetermined number of times, wherein different authentication information are used.

19. An apparatus, comprising:

sending means for sending, during a subscriber equipment terminated call, a session invitation message to the subscriber equipment, the session invitation message including authentication information;

determining means for determining whether a verification of the authentication is required; and, transceiver means for forwarding a scheduled result to a second control network by including the scheduled result into the session invitation message, if the verification is not required, wherein if the verification is required, the transceiver means is for receiving the scheduled result from another network control element, wherein the scheduled result is included in the session invitation message, extracting means for extracting the scheduled result from the session invitation message and to forward the session invitation message without the scheduled result to the subscriber equipment, verification means for verifying an authentication result with a scheduled result and repeating means for repeating the verification for a predetermined number of times, wherein different authentication information are used.

\* \* \* \* \*